United States Patent [19]

Ross et al.

[11] Patent Number: 4,936,095
[45] Date of Patent: Jun. 26, 1990

[54] HYDROSTATIC TRANSMISSION SYSTEM AND POWER LIMITER CONTROL THEREFOR

[75] Inventors: William A. Ross, Excelsior; Randal E. Arlt, Eden Prairie, both of Minn.

[73] Assignee: Eaton Corporation, Cleveland, Ohio

[21] Appl. No.: 264,290

[22] Filed: Oct. 28, 1988

[51] Int. Cl.⁵ .................................................. F16D 31/02
[52] U.S. Cl. ...................................... 60/444; 60/464; 60/468; 60/487; 60/488
[58] Field of Search .................. 60/444, 464, 468, 487, 60/488

[56] References Cited

U.S. PATENT DOCUMENTS

| | | | |
|---|---|---|---|
| 3,164,960 | 1/1965 | Weisenbach et al. | 60/52 |
| 3,359,727 | 12/1967 | Hann et al. | 60/53 |
| 3,477,225 | 11/1969 | Cryder et al. | 60/19 |
| 3,650,108 | 3/1972 | Isaac | 60/53 |
| 3,884,039 | 5/1975 | Pouriam | 60/445 |
| 4,041,702 | 8/1977 | Habiger | 60/445 |
| 4,158,290 | 6/1979 | Cornell | 60/445 |
| 4,167,853 | 9/1979 | Hamma et al. | 60/488 |
| 4,189,921 | 2/1980 | Knapp | 60/488 |
| 4,476,680 | 10/1984 | Pollman et al. | 60/444 |
| 4,512,723 | 4/1985 | Williams | 417/222 |
| 4,527,393 | 7/1985 | Young | 60/444 |
| 4,617,797 | 10/1986 | Williams | 60/444 |
| 4,694,648 | 9/1987 | Beck, Jr. | 60/444 |

FOREIGN PATENT DOCUMENTS 48711 11/1987 U.S.S.R. .......................... 417/222

Primary Examiner—Edward K. Look
Assistant Examiner—John E. Ryznic
Attorney, Agent, or Firm—L. J. Kasper

[57] ABSTRACT

An improved closed-loop hydrostatic transmission system is provided of the type including a pump (11), a motor (13), and a pair of conduits (15 and 17). The system includes a main control valve (43) and a charge pump (23) which is the sole source of make-up fluid to the closed-loop system and the sole source of control fluid for varying the pump. The system includes a power limiting means comprising first and second pressure relief valve means (75 and 77) operable to provide fluid communication from whichever side of the closed-loop is at high pressure to the system reservoir whenever system pressure exceeds the predetermined maximum pressure. The motor is adapted to transmit drive torque to a reversible load (37) of the type having a known inertia and a predeterminable time of deceleration from maximum speed operation in one direction to a standstill condition. A flow restriction means (44) in series relationship between the charge pump and a fluid pressure responsive means (31,33) of the pump is selected such that reversal of the main control valve (43) from maximum displacement in one direction to maximum displacement in the opposite direction results in destroking of the pump in a time period approximately equal to the time of deceleration of the reversible load, thereby substantially preventing cavitation and high-pressure spikes.

6 Claims, 4 Drawing Sheets

FIG. IA

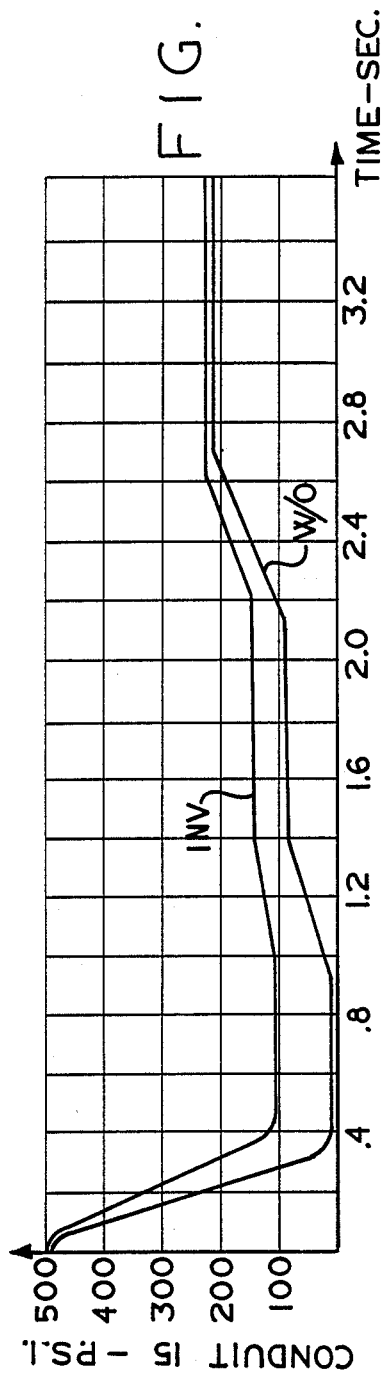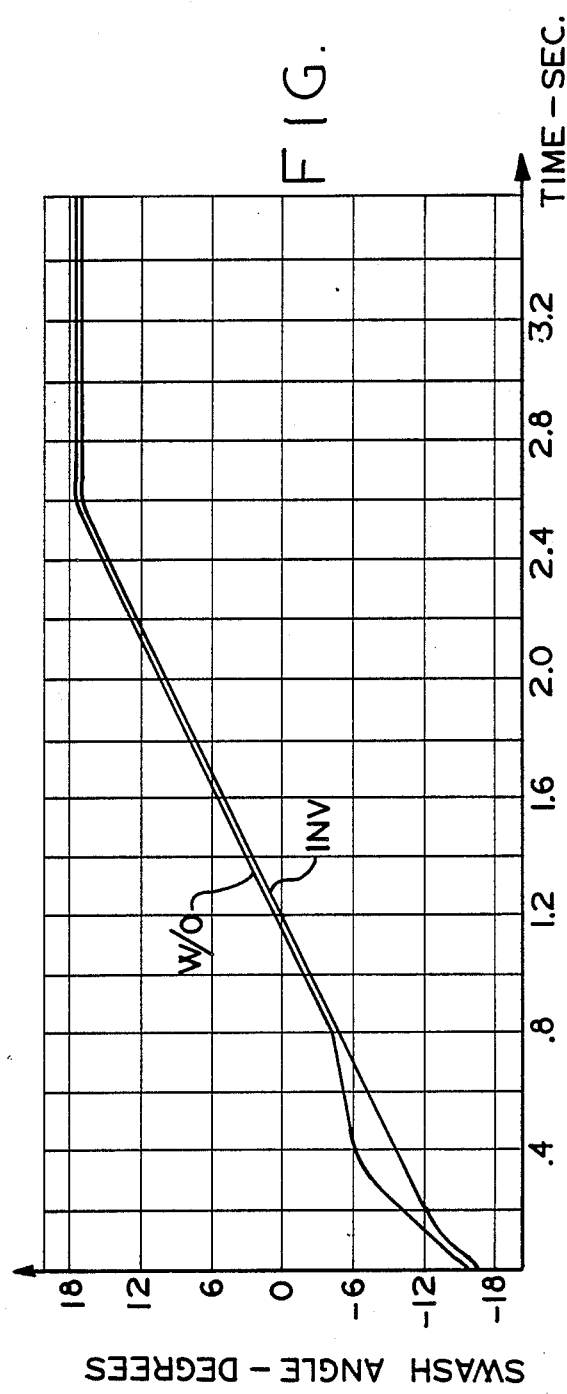

HYDROSTATIC TRANSMISSION SYSTEM AND POWER LIMITER CONTROL THEREFOR

BACKGROUND OF THE DISCLOSURE

The present invention relates to hydrostatic transmission systems and controls, and more particularly, to closed loop hydrostatic transmissions of the type including a charge pump which serves as the sole source of make-up fluid to the closed loop, and as the sole source of control fluid to the system controls.

A typical closed loop hydrostatic transmission system of the type to which the present invention relates is illustrated and described in U.S. Pat. No. 3,359,727. In such systems, the closed loop and the various system components are protected from excessive pressures by means of a pair of high-pressure (over-pressure) relief valves which are typically included in a valve block associated with the system motor. Such relief valves are sized to be able to communicate full system flow from the high-pressure side of the loop to the low-pressure side, and as a result, are quite large and expensive.

Many such closed loop hydrostatic transmission systems also require some sort of power-limiting control, i.e., a control system which will automatically destroke the variable pump whenever the total input power consumed by the pump exceeds a predetermined maximum. Such power limiting controls tend to be fairly complex and expensive, because such systems require, as inputs, factors such as system pressure, pump displacement, and maximum predetermined power setting. See for example U.S. Pat. No. 3,884,039, illustrating such a control system including both hydraulic and mechanical controls.

SUMMARY OF THE INVENTION

It is an object of the present invention to provide an improved power-limiting control for a closed loop hydrostatic transmission, wherein such control is much simpler and less expensive than prior art power-limiting controls.

It is a related object of the present invention to provide an improved closed loop hydrostatic transmission system which eliminates the need for the high-pressure relief valve arrangement, typically associated with the motor valve block, wherein each relief valve must be capable of communicating substantially the entire system flow from the high-pressure side of the loop to the low-pressure side.

The above and other objects of the invention are accomplished by the provision of a closed loop hydrostatic transmission system of the type including a system reservoir, a variable displacement pump adapted to be driven by a source of power, and including fluid pressure responsive means for varying the displacement of the pump. A fixed displacement motor is adapted to transmit drive torque to a reversible load having a known inertia, and first and second conduits interconnect the motor and the pump. The system includes a charge pump adapted to be driven by the source of power, the charge pump comprising the sole source of make-up fluid to the closed loop system, and the sole source of control fluid for varying the displacement of the pump. A main control means is operable to control the flow of control fluid from the charge pump to the fluid pressure responsive means, the main control defining flow restriction means in series flow relationship between the charge pump and the fluid pressure responsive means. The system further includes a power-limiting control.

The improved transmission system is characterized by the power-limiting control comprising a first pressure relief valve means operable to provide fluid communication between the first conduit and the system reservoir when the fluid pressure in the first conduit exceeds a predetermined maximum pressure, and a second pressure relief valve means operable to provide fluid communication between the second conduit and the system reservoir when the fluid pressure in the second conduit exceeds a second predetermined maximum pressure. The known inertia of the load and the predetermined maximum pressures establish a predeterminable time of deceleration of the reversible load and motor from maximum speed operation in one direction to a standstill condition. The flow restriction means is selected such that reversal of the main control from maximum displacement operation in the one direction to maximum displacement operation in the opposite direction results in destroking of the pump from its maximum displacement to its neutral displacement in a time period approximately equal to the predeterminable time of deceleration of the reversible load, thereby substantially preventing cavitation and high-pressure spikes.

BRIEF DESCRIPTION OF THE DRAWINGS

FIG. 1A is a fragmentary illustration, partly in schematic form and partly in cross-section, of the power limiter valve arrangement, which forms one aspect of the present invention.

FIG. 4 is a graph of pressure versus TIME for the low-pressure side of the system, comparing systems with and without the present invention.

FIG. 5 is a graph of swash angle versus TIME, comparing systems with and without the present invention.

DESCRIPTION OF THE PREFERRED EMBODIMENT

Figure 1:
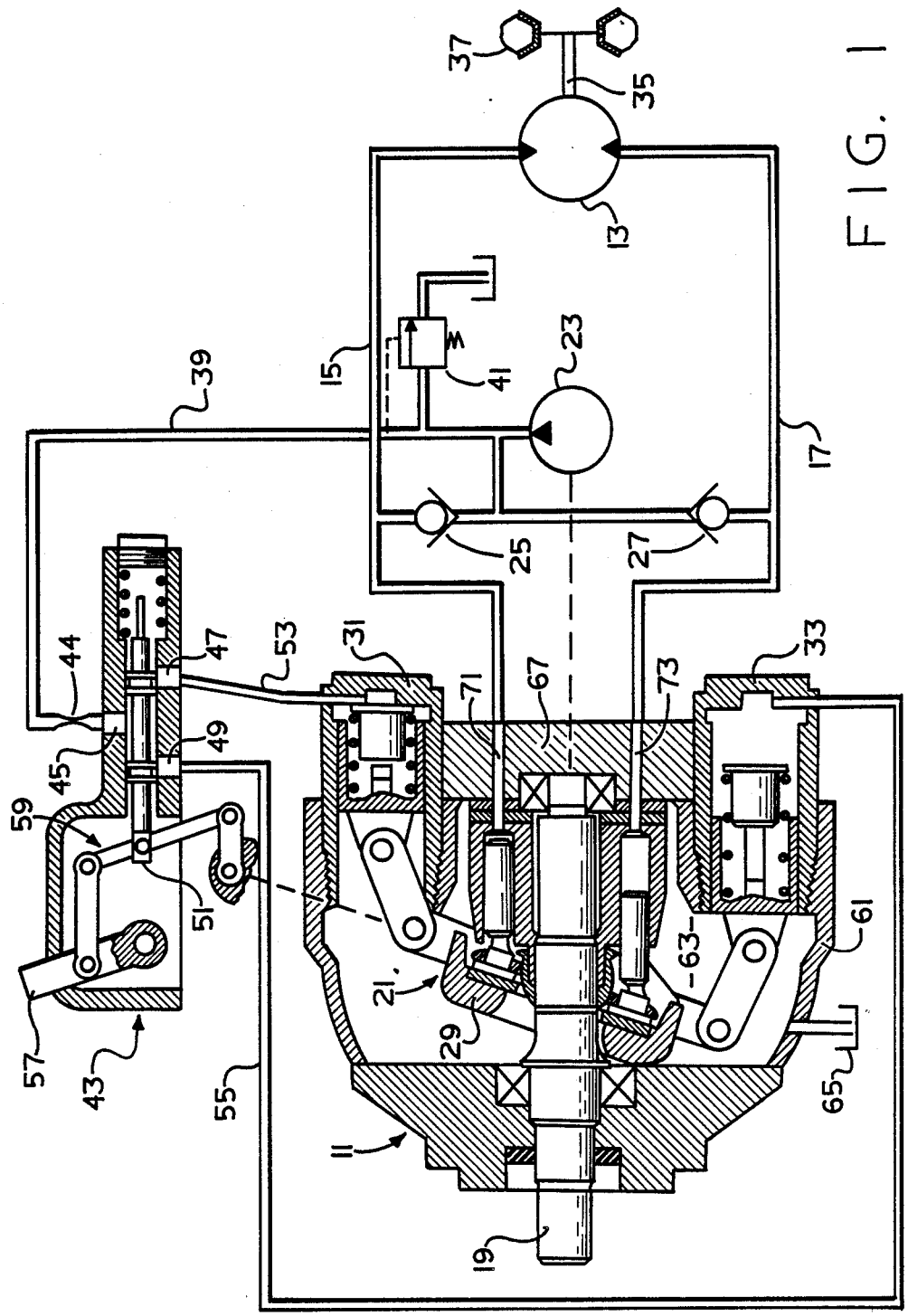
FIG. 1 is an illustration, partly in schematic and partly in cross-section, of a hydrostatic transmission control system of the type to which the present invention relates.

Referring now to the drawings, which are not intended to limit the invention, FIG. 1 illustrates the typical hydrostatic transmission system of the type to which the present invention relates. The system of FIG. 1 includes a variable displacement axial piston pump, generally designated 11, hydraulically coupled to a fixed displacement motor 13 by means of a pair of fluid conduits 15 and 17. The pump 11 may be of a well known type including an input shaft 19, which drives the rotating group, generally designated 21, as well as a charge pump 23, the output of which is the sole source for make-up fluid to either conduit 15, through a check valve 25, or conduit 17, through a check valve 27. As is well known to those skilled in the art, the output of the charge pump 23 is communicated to whichever of the conduits 15 or 17 is at lower fluid pressure.

The pump 11 further includes a swashplate 29 which is pivotable, to vary the displacement of the pump 11, by means of a pair of stroking cylinders 31 and 33, as is generally well known in the art. The motor 13 includes an output shaft 35, which is connected to drive a load, represented schematically in FIG. 1 as a driven wheel 37, used to propel the vehicle on which the hydrostatic transmission system is operating.

The output of the charge pump 23, aside from being directed to one of the conduits 15 or 17 as make-up fluid, is communicated by means of a conduit 39 to a control mechanism, to be described subsequently, the conduit 39 also being connected to a charge pump relief valve 41, which is typically set at a pressure such as 300 p.s.i.

The hydrostatic transmission system illustrated in FIG. 1 is of the type referred to as a "closed loop" system, primarily because low-pressure return fluid is communicated from the motor 13 through one of the conduits 15 or 17 to the inlet side of the pump 11, with only leakage fluid being communicated to the system reservoir. Thus, any fluid lost from the main system loop (pump 11, motor 13, and conduits 15 and 17) is replaced by the charge pump 23.

The fluid pressures in the stroking cylinders 31 and 33, and therefore the displacement of the swashplate 29, are determine by a manually operated main control valve, generally designated 43. Control fluid pressure from the charge pump 23 is communicated by the conduit 39 through a fixed control orifice 44, to a control port 45. Control pressure may be directed to either of a pair of stroker ports 47 or 49, depending upon the position of a control valve spool 51. The stroker port 47 is in fluid communication with the stroking cylinder 31 by means of a conduit 53, and the stroker port 49 is in fluid communication with the stroking cylinder 33 by means of a conduit 55. The control valve 43 includes a manually operated control lever 57, and linkage, generally designated 59, connecting the control valve spool 51 with the control lever 57, and also with the swashplate 29. The linkage 59 moves the spool 51 to a neutral position when the angular displacement of the swashplate 29 corresponds to the setting of the control lever 57, to maintain the swashplate in that position.

It should be understood that the present invention is not limited to any particular type of main control valve, but it is an essential feature of the present invention that it be used in connection with a closed loop transmission system in which the charge pump 23 comprises the sole source of both make-up fluid to the closed loop, as well as control fluid to the main control valve.

In most transmission systems of the type shown in FIG. 1, the motor includes a rather large and expensive valve block, including a pair of high-pressure relief valves, with one of the relief valves being connected to communicate fluid from the conduit 15 to the conduit 17, whenever the conduit 15 contains fluid at a pressure above the relief setting, and the other is connected to communicate fluid from conduit 17 to the conduit 15 whenever the conduit 17 contains fluid at pressures above the relief setting. One reason that such relief valves are typically large and expensive is that each must be sized to communicate substantially the entire system flow (i.e., the entire output flow of the pump at its maximum displacement), at approximately the relief pressure, and to withstand the heat generated by such flows and pressures. It is one important aspect of the present invention to eliminate the need for these prior art high-pressure relief valves, thus eliminating the expense of the large relief valves, and making it possible to substantially reduce the size, weight and cost of the motor valve block.

Referring still to FIG. 1, the axial piston pump 11 includes a pump housing, generally designated 61, a portion of which surrounds the rotating group 21 and defines a case chamber 63. As shown schematically in FIG. 1, the case chamber 63 is in open communication with a system reservoir 65. The pump housing 61 includes an endcover 67, which defines a pair of fluid passages 71 and 73, the passage 71 providing communication, as shown in FIG. 1, between the contracting cylinders of the rotating group 21 and the conduit 15, while the fluid passage 73 provides communication between the fluid conduit 17 and the expanding cylinders of the rotating group 21.

Referring now to FIG. 1A, one aspect of the present invention will be illustrated somewhat schematically. As was mentioned previously, it is an object of the invention to eliminate the need for the large, expensive high-pressure relief valves typically included in the motor valve block. However, it would be apparent to one skilled in the art that some form of high-pressure relief is still required for the protection of the closed loop system and the pump, motor, and conduits. Therefore, FIG. 1A illustrates a relief valve arrangement, in accordance with the present invention, which would preferably be located in the endcover 67. It is an important aspect of the present invention that the relief valves do not cross-port, as in typical prior art closed loop transmission systems (i.e., excess pressure in the high-pressure side is not merely relieved to the low-pressure side of the closed loop). Instead, fluid above the relief setting is communicated from the closed loop to the system reservoir 65. As shown schematically in FIG. 1A, a relief valve 75 is disposed to relieve excess pressure from the fluid passage 71 to the case chamber 63, and a relief valve 77 is disposed to relieve excess pressure from the fluid passage 73 to the case chamber 63, from where it flows to the system reservoir 65.

Figure 2:
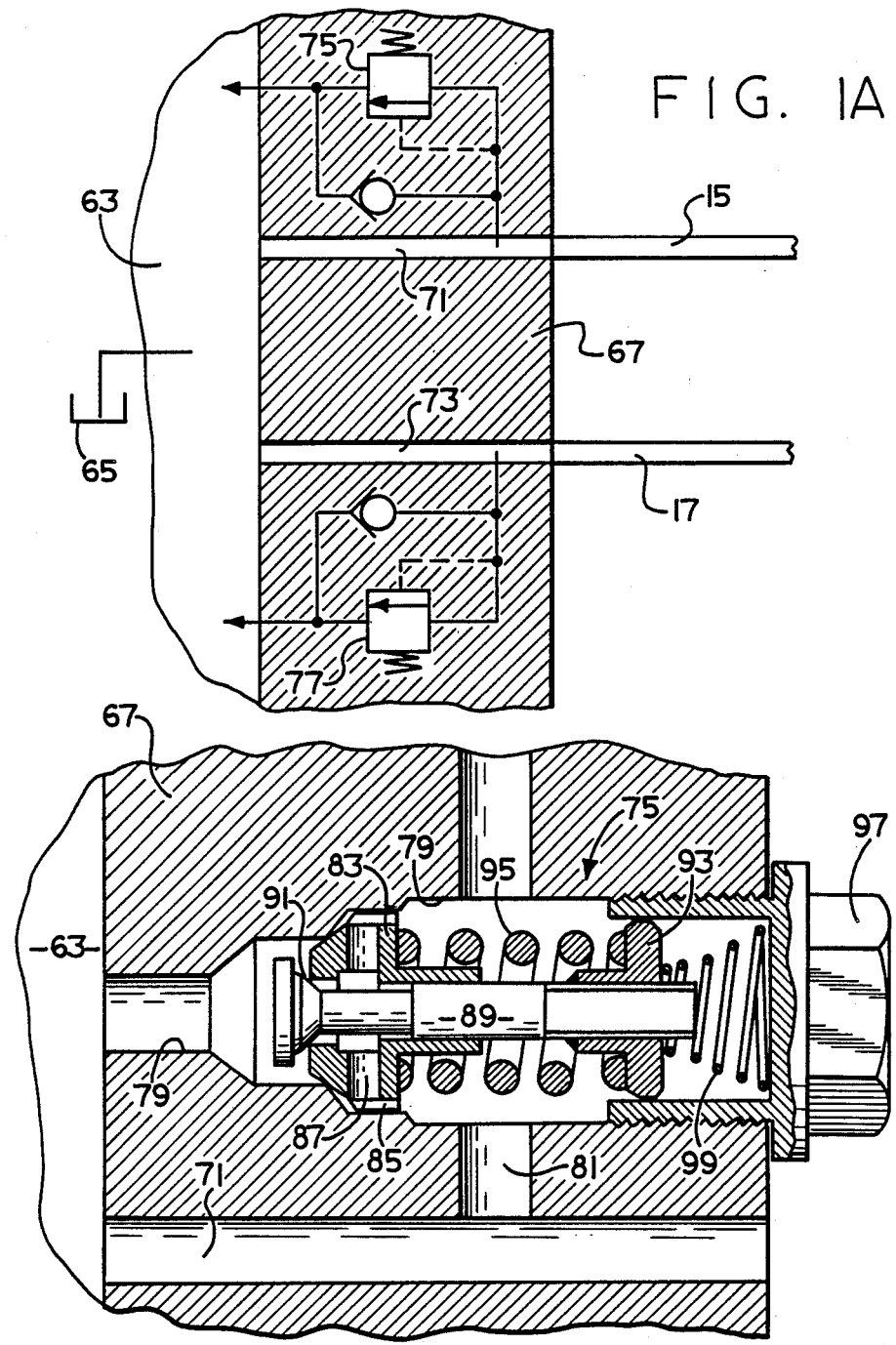
FIG. 2 is an axial cross-section through the end cover of the pump of FIG. 1, but on a larger scale, illustrating one of the relief valves which comprise part of the present invention.

Referring now to FIG. 2, the relief valve 75 will be described in greater detail, and it should be clearly understood that the subsequent description would be equally applicable to the relief valve 77. The endcover 67 defines a stepped bore 79, oriented generally parallel to the fluid passage 71. Interconnecting the passage 71 and bore 79 is a passage 81. Disposed within the stepped bore 79 is the relief valve assembly 75, which includes a seat member 83 defining a plurality of flats 85 (or notches or any other structure permitting fluid communication). The seat member 83 defines a radial passage 87 providing communication from the adjacent flat 87 to the interior of the member 83.

Disposed within the member 83 is a poppet assembly including a poppet member 89 defining a generally conical poppet surface 91. Disposed at the right end (in FIG. 2) of the poppet member 89 is a washer member 93 fixed to the member 89 by any suitable means such as welding. Disposed between the seat member 83 and the washer 93 is a helical compression spring 95, which determines the pressure setting of the relief valve 75. The right end of the stepped bore 79 receives a hollow plug member 97, and disposed between the washer 93 and plug member 97 is a relativelY light compression spring 99 which permits the entire relief valve assembly 75 to serve as a check valve also, as will be described in greater detail subsequently.

In the subject embodiment, the compression spring 95 is selected such that the relief valves 75 and 77 have a setting of 6,500 p.s.i. The pressure of the fluid in the passage 71 is also present in the flats 85 and the radial passages 87, and within the interior of the seat member 83, exerting a biasing force against the portion of the poppet surface 91 disposed radially inwardly from the seat defined by the seat member 83. When the fluid pressure in the passage 71 (and the conduit 15) exceeds 6,500 p.s.i., the force on the poppet surface 91 is sufficient to overcome the biasing force of the compression spring 95 and move the poppet member 89 to the left in FIG. 2, relieving the excess pressure from the passage 71, through the passage 81, and past the poppet surface 91, then through the bore 79 and into the case chamber 63, and to the system reservoir 65. As is well known to those skilled in the art of relief valves, a pressure of 6,500 p.s.i. will cause the poppet member 89 to move to the left just enough to keep the fluid pressure in the passage 71 from rising above 6,500 p.s.i. As the pressure in the passage 71 rises substantially above 6,500 p.s.i., the poppet member 89 will move further to the left, permitting a greater amount of flow. In the relief valve 75, by way of example only, if the pressure in the passage 71 rises to about 6,800 p.s.i., the poppet member 89 will be fully open to permit a particular flow rate (assumed in our subsequent example to be 8 g.p.m.). The relief valve 75 can pass more than 8 g.p.m., if the pressure in the passage 71 rises substantially above 6,800 p.s.i.

If, at any time, the fluid pressure in the conduit 15 and passage 71 drops below the pressure in the case chamber 63 (which would be likely to occur only when the conduit 17 is the high-pressure side of the loop), the fluid pressure in the case chamber 63 and in the bore 79 may be sufficient to bias the poppet member 89 and seat member 83 to the right in FIG. 2, overcoming the force of the compression spring 99. Fluid would then flow from the bore 79, past the seat member 83, then through the passage 81 into the passage 71.

OPERATION

It is another important aspect of the present invention that the relief valve arrangement described above is able to satisfactorily perform the function of a power limiter control, without the need for a separate, and relatively complicated and expensive control assembly. As used herein, the term "power limiter" is intended as a generic term, such that the control of the present invention could be used in place of various controls known in the prior art by such terms as "pressure overrides"; "pressure limiters"; "horsepower limiters"; or, "torque limiters".

The operation of the present invention as a power limiter will now be described. Referring primarily to FIGS. 1 and 1A, and assuming that the pump is operating at its maximum displacement (typically, about 18 degrees swash angle) the output flow volume of the pump will be assumed to be 50 g.p.m., while the output flow volume of the charge pump 23 will be assumed to be 8 g.p.m. As mentioned previously, the relief valves 75 and 77 are sized to communicate approximately 8 g.p.m. when the poppet member is fully opened, and the pressure in the conduit 15 or 17, respectively, is within several hundred p.s.i. above the relief setting. The operation of the invention will be described with reference to two different operating conditions. The first condition to be described is a typical overload condition of the type which would occur if the vehicle encountered an obstacle which it would not be able to move, thus causing the load on the motor 13 to increase and causing the pressure in the conduit 15 to exceed the 6,500 p.s.i. relief setting of the relief valve 75. As soon as the pressure in the passage 71 somewhat exceeds 6,500 p.s.i., the relief valve 75 begins to communicate 8 g.p.m. from the passage 71 to the case chamber 63, thus leaving only 42 g.p.m. circulating through the closed loop which is insufficient to keep the pump inlet full, with the pump at maximum displacement. Therefore, the entire 8 g.p.m. output of the charge pump 23 is communicated past the check valve 27 into the conduit 17, to keep the closed loop full of fluid.

In the situation as described above, with the entire output of the charge pump serving as make-up fluid to the closed loop, there is no pressurized fluid available in the conduit 39 to the main control valve 43. As a result, there is insufficient pressure in the stroker port 49 and conduit 55 to maintain the stroking cylinder 33 in a position necessary to keep the swashplate 29 at its maximum displacement. Therefore, the swashplate 29 begins to destroke until it reaches a displacement (in our example, approximately 3 degrees) at which the output of the pump is now reduced to a flow which is approximately equal to the output flow of the charge pump, i.e., 8 g.p.m. When the pump destrokes to a displacement at which this balance occurs, the 8 g.p.m. output of the variable pump 11 is still being relieved, in total, over the relief valve 75 to the case chamber, and the entire output of the charge pump 23 is being communicated to the closed loop as make-up fluid. The displacement of the swashplate 29 does not decrease any further, because the flow output of the charge pump 23 is now able to provide all required make-up fluid to the closed loop, and to begin to build control pressure in the conduit 39 and stroking cylinder 33, thus preventing any further decrease in displacement of swashplate 29. Therefore, it should now be understood why the relief valves 75 and 77 are sized as described above. If the relief valves were sized substantially smaller, the pump 11 would still destroke, because the appropriate relief valve would communicate 8 g.p.m., but only in response to a system pressure substantially greater than the relief setting, i.e., sufficiently above the 6,500 p.s.i. nominal relief setting that damage would be likely to occur to the closed loop system.

It is an essential aspect of the present invention for the power limiter control to be able to perform effectively in a second type of situation, which is not merely a simple pressure overload. The second situation is a reversal of load, of the type which occurs, for example, when the vehicle operator quickly shifts from maximum displacement in one direction of operation to maximum displacement in the opposite direction. In describing a "reversal of load" situation, it will be assumed that the operator shifts, as described above, faster than the vehicle would make the transition by merely coasting to a stop, and then beginning to travel in the opposite direction. In other words, the vehicle operator creates a dynamic braking situation in which pump stroke is reversed, the motor begins to operate as a pump because of the inertia of the vehicle, and the pump begins to operate as a motor, and as a dynamic brake. In developing the power limiter control of the present invention, it was found that the power limiter control as described above was generally satisfactory in typical overload situations, but initially was not satisfactory in the reversal of load type situation just described. It was found during the development of the present invention that, in systems utilizing the power limiter control of the invention wherein the system was subjected to numerous reversals of load, many of the motor parts showed substantial indications of cavitation damage.

As a result of such cavitation damage, it was determined that, during reversal of load-type situations, the pump 11 would destroke much faster than the motor 13 would decelerate, such that the conduit (in the example, conduit 15) communicating from the pump to the motor would not remain sufficiently full and pressurized, and cavitation would occur in the motor. In typical closed loop systems of the type shown in FIG. 1, it is considered desirable to maintain a pressure of at least about 80 p.s.i. throughout the entire closed loop.

In accordance with an additional aspect of the invention, it was discovered that the 80 p.s.i. minimum pressure could be maintained in the closed loop, and cavitation damage prevented, by "matching" the rate of destroke of the pump 11 and the rate of deceleration of the motor 13. In order to accomplish such matching, it is necessary to determine the time of deceleration for the particular motor load (vehicle), which can be determined readily by those skilled in the art based upon knowing the inertia (weight) of the vehicle, the maximum speed of the vehicle, as well as the displacement of the motor, the tire diameter, and the nominal pressure relief setting. Therefore, it is possible to determine the torque being exerted in driving the motor 13 as a pump, during the reversal of load. From the above, it is possible to calculate the time required for the vehicle to decelerate from its maximum vehicle speed to zero. It is recognized that certain factors, especially the weight of the vehicle, can change, and therefore, the deceleration time referred to above will be merely a typical time, or may be calculated as range, corresponding to the vehicle being empty, versus fully loaded.

Once the time for the motor to decelerate is known, the next step is to insure that the time required for the pump to destroke is substantially the same. Referring again to FIG. 1, one way of accomplishing the desired matching of motor deceleration and pump destroke is by selecting an appropriate size for the control orifice 44. As may be seen in FIG. 1, in order for the angle of the swashplate 29 to decrease toward the neutral position, it is necessary to communicate pressurized control fluid through the conduit 39, then through the control orifice 44 to the control port 45, then past the spool 51 to the stroker port 47, then through the conduit 53 to the stroking cylinder 31, thus "powering" the swashplate 29 toward the neutral position. At the same time, pressurized control fluid in the stroking cylinder 33 must be expelled back through the conduit 55 to the stroker port 49, then past the spool 51 to the system reservoir. The size of the control orifice 44 is normally selected primarily on the basis of providing an acceptable level of responsiveness of the overall displacement control system. However, in order to match the pump destroke time to the motor deceleration time, the control orifice 44 will typically be somewhat smaller than it would have been if the criteria for its selection would have been primarily the response time of the overall control system.

The significance of the selection of the control orifice 44, and the matching of pump destroke to motor deceleration, will now be illustrated by reference to the graphs of FIGS. 3, 4 and 5. The purpose of the graphs is to compare various system parameters, with and without the control orifice and matching aspects of the present invention. For purposes of illustrating the invention, the comparison will be based upon an assumed use of a typical control orifice 44 having a diameter of 0.102 inches, which is one of the standard control orifice sizes used commercially by the assignee of the present invention. In the subject embodiment, it was found that the proper matching of pump destroke and motor deceleration occurred with a control orifice 44 having a diameter of 0.073 inches. This was determined somewhat empirically. Therefore, the graphs labeled "W/O" represent a control system without the control orifice and matching aspects of the invention, whereas those labeled "INV" represent a system including those aspects of the invention.

Figure 3:
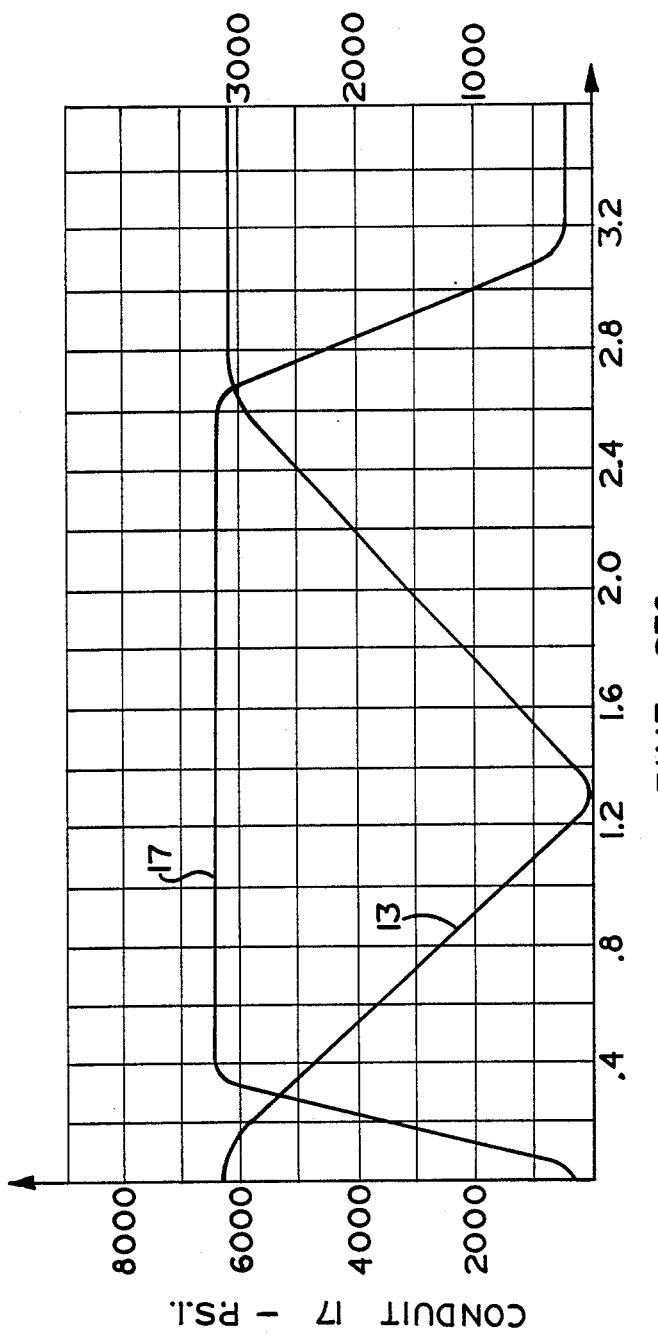
FIG. 3 is a graph showing main system pressure and motor speed as a function of time, with or without the present invention.

FIG. 3 is a graph having a double ordinate, with the left hand ordinate being the pressure in the conduit 17 (in p.s.i.) and the right hand ordinate being the motor speed (in r.p.m.). In the graph of FIG. 3, as well as the graphs of FIGS. 4 and 5, the abscissa is TIME, and it should be noted that all of the graphs in FIGS. 3, 4 and 5 cover the same period of TIME.

Referring again to FIG. 3, it may be seen that the pressure in the conduit 17 (graph labeled "17") is initially at a pressure of about 300 p.s.i., thus indicating that the conduit 15 was, at that point in time, the low-pressure side of the loop. The motor speed (graph labeled "13") was initially 3,200 r.p.m. in the clockwise direction. At approximately TIME equals zero, the vehicle operator shifted the control lever 57 from a position selecting maximum pump displacement in the forward direction, to a position selecting maximum pump displacement in the opposite direction (referred to previously as a "reversal of load" condition). As the motor speed begins to drop rapidly, the motor 13 is now being driven as a pump, the pressure in the conduit 17 rapidly increases to about 6,500 p.s.i. (the setting of the relief valve 77), then stays at that level until TIME equals 2.6 seconds, at which point the motor speed has decreased to zero, reversed direction, and again approached the maximum speed of 3,200 r.p.m., but now in the counterclockwise direction. Once the motor speed has again reached its 3,200 r.p.m. level, the torque required to maintain that speed is much less, and the pressure in the conduit 17 drops until it is approximately 500 p.s.i. It should be noted that the graphs in FIG. 3 represent operating conditions in the systems both with and without the control orifice and matching features of the present invention, i.e., the presence or absence of those features do not affect the pressure in the conduit 17 or the motor speed.

Referring now to FIG. 4, there is illustrated a graph of pressure in the conduit 15 as a function of time. The graph labeled "W/O" shows that without the control orifice and matching features of the invention, the pressure in the conduit 15 is initially about 500 p.s.i., but as the reversal of load occurs, the pressure in the conduit 15 drops rapidly, and after approximately TIME equals 0.3 seconds, the pressure in the conduit 15 is approximately zero. At approximately TIME equals 1.0 seconds, the pressure in the conduit 15 begins to rise, then levels off at approximately 80 p.s.i. By way of contrast, the graph representing the invention shows that the pressure in the conduit 15 was initially about 500 p.s.i., but during the reversal of load, the pressure in the conduit 15 dropped to no less than about 100 p.s.i., then at approximately TIME equals 1.0 seconds, increased slightly and leveled out at about 160 p.s.i. It is clear from the graph of FIG. 4 that, with the present invention, there will be sufficient pressure maintained in the closed loop to substantially eliminate the chance of cavitation damage.

Referring now to FIG. 5, in either system, with or without the invention, the angle of the swashplate 29 was initially the maximum of 18 degrees in one direction (indicated in the graph as negative), then decreases toward neutral during the reversal of load, passes through neutral and then increases in the opposite direction (illustrated in the graph as positive). However, in the graph in FIG. 5 indicating the system without the present invention, it may be seen that the swash angle initially decreases at a more rapid rate, and then at approximately TIME equals 0.5 seconds, the swash angle nearly levels off at approximately 5 degrees until approximately TIME equals 0.8 seconds. It is recognized by those skilled in the art that the relatively level portion of the destroke graph in FIG. 5 is evidence of cavitation, because the shape of the destroke graph (compared to the steady decrease in motor speed shown in FIG. 3) indicates a time period during which the pump is "waiting" for additional fluid. By way of comparison, the graph for the system including the invention shows that the destroke of the pump 11 occurs at a generally constant rate.

The invention has been described in great detail sufficient to enable one skilled in the art to make and use the same. It is believed that various alterations and modifications of the invention will become apparent to those skilled in the art from a reading and understanding of the specification. It is intended that all such alterations and modifications are included in the invention, as so far as they come within the scope of the appended claims.

We claim:

1. A closed loop hydrostatic transmission system of the type including a system reservoir; a variable displacement pump unit adapted to be driven by a source of power, and including fluid pressure responsive means for varying the displacement of the pump unit; a fixed displacement motor unit adapted to transmit drive torque to a reversible load having a known inertia; first and second conduits interconnecting said motor unit and said pump unit; charge pump means adapted to be driven by said source of power, said charge pump means comprising the sole source of make-up fluid to said closed loop hydrostatic transmission system, and the sole source of control fluid for varying the displacement of said pump unit; main control means operable to control the flow of control fluid from said charge pump means to said fluid pressure responsive means, said main control means defining flow restriction means in series flow relationship between said charge pump means and said fluid pressure responsive means; and power limiting control means; characterized by:

(a) said power limiting control means comprising a first pressure relief valve means operable to provide fluid communication between said first conduit and said system reservoir when the fluid pressure in said first conduit exceeds a first predetermined maximum pressure, and a second pressure relief valve means operable to provide fluid communication between said second conduit and said system reservoir when the fluid pressure in said second conduit exceeds a second predetermined maximum pressure;

(b) said known inertia and said predetermined maximum pressures establishing a predeterminable time of deceleration of said reversible load and said motor unit from maximum speed operation in one direction to a standstill condition; and (c) said flow restriction means being selected such that reversal of said main control means from maximum displacement operation in said one direction to maximum displacement operation in the opposite direction results in destroking of said pump unit from its maximum displacement to its neutral displacement in a time period approximately equal to said predeterminable time of deceleration of said reversible load.

2. A transmission system as claimed in claim 1 characterized by said charge pump means comprising a single pumping element operable to be in fluid communication with either of said first and second conduits through check valve means, and with said main control means through a fluid conduit.

3. A transmission system as claimed in claim 1 characterized by said pump unit including housing means defining a fluid chamber in open fluid communication with said system reservoir, each of said first and second pressure relief valve means including a fluid outlet means in open fluid communication with said fluid chamber defined by said housing means.

4. A transmission system as claimed in claim 1 characterized by said variable displacement pump unit being sized to provide, when at its maximum displacement, a flow volume X at a given input speed; and said charge pump means being sized to provide a flow volume Y at said given input speed, said flow volume X being substantially greater than said flow volume Y.

5. A transmission system as claimed in claim 4 characterized by said first pressure relief valve means communicating pressurized fluid from said first conduit to said system reservoir when the fluid pressure in said first conduit exceeds said first predetermined maximum pressure, whereby the output of said charge pump means is required as make-up fluid to said closed loop hydrostatic transmission system, and there is insufficient control fluid communicated to said fluid pressure responsive means to maintain said variable displacement pump unit at its maximum displacement.

6. A transmission system as claimed in claim 5 characterized by the displacement of said pump unit continues to decrease from said maximum displacement, and the flow volume of said pump unit continues to decrease from said flow volume X until the displacement of said pump unit has decreased to a displacement at which the flow volume of said pump unit is equal to approximately said flow volume Y.

* * * * *